United States Patent
Gopalakrishnan et al.

(10) Patent No.: US 10,244,683 B2
(45) Date of Patent: Apr. 2, 2019

(54) DRIVE SYSTEM FOR COMBINE HARVESTER PROCESSOR AND METHOD OF PROVIDING SUCH

(71) Applicant: AGCO Corporation, Duluth, GA (US)

(72) Inventors: Krishnamoorty Gopalakrishnan, Hesston, KS (US); Sivakumar Villappan, Hesston, KS (US); Ananthanarayanan Santhanagopalan, Hesston, KS (US); William Ryan Haar, Valley Center, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 15/562,525

(22) PCT Filed: Jan. 27, 2016

(86) PCT No.: PCT/IB2016/000056
§ 371 (c)(1),
(2) Date: Sep. 28, 2017

(87) PCT Pub. No.: WO2016/156957
PCT Pub. Date: Oct. 6, 2016

(65) Prior Publication Data
US 2018/0092307 A1 Apr. 5, 2018

Related U.S. Application Data

(60) Provisional application No. 62/141,989, filed on Apr. 2, 2015.

(51) Int. Cl.
*A01F 7/06* (2006.01)
*A01F 12/56* (2006.01)

(52) U.S. Cl.
CPC .............. *A01F 12/56* (2013.01); *A01F 7/06* (2013.01)

(58) Field of Classification Search
CPC .. A01D 41/142; A01D 41/1274; A01D 61/00; A01D 61/04; A01D 75/187;
(Continued)

(56) References Cited

U.S. PATENT DOCUMENTS 4,209,024 A * 6/1980 Powell .................... A01F 12/10
460/70
4,254,780 A * 3/1981 Powell ...................... A01F 7/06
460/66

(Continued)

FOREIGN PATENT DOCUMENTS

DE 1407744 A1 11/1968
GB 1074915 A 7/1967
(Continued)

OTHER PUBLICATIONS

European Patent Office, International Search Report for related International Patent Application No. PCT/IB2016/000056, dated Jun. 10, 2016.
(Continued)

*Primary Examiner* — Robert E Pezzuto (57) ABSTRACT

A combine harvester including an axial flow crop processor fed by a tangentially impelling feed beater mounted for rotation on a substantially transverse axis, and a multi-speed beater drive system that includes a beater shaft upon which the beater is mounted via bearings to permit relative rotational movement, and a secondary shaft arranged parallel to the beater shaft. To achieve a first beater drive speed a first drive path is closed between the beater shaft and the beater. To achieve an alternative, second beater drive speed a second drive path is closed between the secondary shaft and the beater. Both the beater shaft and the secondary shaft are driven simultaneously during operation.

12 Claims, 5 Drawing Sheets

(58) Field of Classification Search
CPC ........ A01F 12/442; A01F 12/22; A01F 12/16;
A01F 12/56; A01F 12/58; A01F 12/10;
A01F 7/06; A01F 7/067
USPC ................ 56/14.6, 119; 460/16, 68, 70, 105
See application file for complete search history.

(56) References Cited

U.S. PATENT DOCUMENTS

| | | | |
|---|---|---|---|
| 4,266,560 A | | 5/1981 | Powell et al. |
| 4,343,137 A | * | 8/1982 | Seymour ................. A01F 12/16 |
| | | | 460/106 |
| 4,454,787 A | | 6/1984 | Love et al. |
| 4,879,868 A | | 11/1989 | Love |
| 5,368,522 A | * | 11/1994 | Ricketts .................. A01F 12/10 |
| | | | 460/105 |
| 5,556,337 A | | 9/1996 | Tophinke et al. |
| 8,920,226 B2 | * | 12/2014 | Duquesne ............ A01D 75/187 |
| | | | 460/105 |
| 2004/0043847 A1 | | 3/2004 | Jonckheere et al. |

FOREIGN PATENT DOCUMENTS

| | | |
|---|---|---|
| GB | 2068483 A | 8/1981 |
| WO | 2014/136862 A1 | 9/2014 |

OTHER PUBLICATIONS

UK Intellectual Property Office, Internatioal Search Report for related UK Application No. GB1506822.4, dated Sep. 14, 2015.

* cited by examiner

DRIVE SYSTEM FOR COMBINE HARVESTER PROCESSOR AND METHOD OF PROVIDING SUCH

BACKGROUND OF THE INVENTION

Field of Invention

The invention relates to drive systems for driving a crop processing system in a combine harvester, and particularly to a multi-speed feed beater drive system. The feed beater is mounted for rotation on a substantially transverse axis and serves to tangentially impel crop material into an axial flow crop processor.

Description of Related Art

For many decades self-propelled combine harvesters have been used by farmers to harvest a wide range of crops including cereals, maize and oil seed rape. Typically a combine harvester cuts the crop material, threshes the grain therefrom, separates the grain from the straw and cleans the grain before storing in an on-board tank. Straw and crop residue is ejected from the rear of the machine.

The crop processor of a combine harvester comprises threshing and separating apparatus. The separating apparatus is traditionally based upon one of two well-established systems. In a first known system straw walkers are used to 'walk' the crop stream rearwardly in the combine wherein agitation caused by this movement causes the grain to fall through an integrated grate whilst the straw residue falls from the rear and out of the combine. In the second alternative system one or two cylindrical rotors are mounted within the combine longitudinally and enclosed by rotor cages wherein crop fed in at the front by a tangential-flow impelling feed beater, travels rearwardly in an axially spiral motion due to interacting crop engaging elements fitted to the rotor tube and guide vanes fitted on the inside of the rotor cage. The cylindrical rotors can provide a threshing and separating action, or a separating action only. Separated grain falls through a grate in the cage whilst the straw residue is conveyed rearwardly and out of the machine. The invention is concerned with driving a feed beater in this second system of separating apparatus.

The feed beater is commonly driven by a belt-drive system comprising belts and pulleys, the beater drive typically comprising a power branch deriving its torque from a main drive system driven by an internal combustion engine. A clutch is typically included in the driveline to allow the operator to selectively engage and disengage the crop processing apparatus which includes, inter alia, the feed beater, the separating apparatus and a grain cleaning shoe.

Combine harvesters are utilized for harvesting a wide range of different crops. It is recognised that certain crops, such as corn, can become damaged if the feed beater rotates too fast. Due to the feed beater being drivingly connected to the other crop processing systems, it is not possible or practical for the operator to slow down the feed beater without affecting the other systems without the provision of a multi-ratio drive to the feed beater.

It is known to provide a multi-ratio drive system for a feed beater but such systems involve many additional components and, as a result, are expensive.

SUMMARY OF THE INVENTION

It is an object of the invention to provide an improved multi-speed feed beater drive system in a combine harvester.

It is another object of the invention to provide a multi-speed feed beater system which is cheaper to manufacture than known systems.

In accordance with a first aspect of the invention there is provided a combine harvester comprising:
- an axial flow crop processor with a rotor mounted for rotation inside a rotor housing arranged substantially longitudinally with respect to the harvester;
- a feed beater mounted for rotation on a substantially transverse axis and serving to tangentially impel crop material into the crop processor; and,
- a multi-speed beater drive system comprising:
    - a beater shaft upon which the beater is mounted via bearings to permit relative rotational movement;
    - a secondary shaft arranged parallel to the beater shaft;
    - a first selectable drive path between the beater shaft and the beater; and,
    - a second, alternate, selectable drive path between the secondary shaft and the beater,
- wherein both the beater shaft and the secondary shaft are driven simultaneously during operation.

The invention exploits at least one of the various driven drive shafts already on the combine to provide an alternative drive source for the feed beater, thereby providing an alternative drive speed. By mounting the feed beater onto its associated support shaft (hereinafter referenced 'beater shaft') via bearings, the drive connection therebetween is disconnected leaving open the option to drive the feed beater by the beater shaft or another driven shaft (hereinafter referenced 'secondary shaft').

Advantageously, the invention dispenses with the need for expensive multi-ratio gearboxes and the like, and achieves alternative beater drive speeds by drawing power from other drive shafts, such as those connected to other systems.

It should be understood that the term "multi-speed" used in connection with the feed beater drive is well known in the art and equates to a system that is provided with functionality to enable an operator to change the drive ratio between a source of torque and the feed beater to provide different beater speeds at a given engine speed.

In one preferred embodiment, the secondary shaft forms part of a cleaning shoe driveline. For example, the secondary shaft may be drivingly connected to the shaker sieves.

The first drive path preferably comprises a selectable drive connection between the beater shaft and the beater. By simply connecting the beater shaft to the beater, the beater is caused to rotate in unison with the beater shaft at the same speed. In this mode of operation, the beater speed equates directly to the beater shaft speed.

In a preferred embodiment of such the first drive path comprises a first sprocket keyed to the beater shaft, and a second sprocket mounted for rotation on the beater shaft in a fixed relationship with the feed beater, wherein the first and second sprockets are configured for coupling together when the first drive path is selected. The first and second sprockets may be coupled together by a chain coupler.

The second drive path may comprise a third sprocket keyed to the secondary shaft, wherein the second and third sprockets are configured for coupling together when the second, alternative speed, drive path is selected. Advantageously, the drive speed of the beater can be changed by simply removing the chain coupler and adding a chain between the second and third sprockets, or vice versa.

In another preferred embodiment, the first selectable drive path comprises a collar keyed to the beater shaft, and a hub mounted for rotation on the beater shaft in a fixed relationship with the feed beater, wherein each of the collar and hub comprise an integral flange, each flange having an axial hole, the holes being mutually alignable for receiving a bolt for coupling the collar and hub together. Advantageously, the beater can be simply drivingly connected to the beater shaft by inserting a bolt between the two flanges.

The second drive path may comprise a first sprocket mounted to, or integral with, the hub, and a second sprocket keyed to the secondary shaft, wherein the first and second sprockets are configured for coupling together, for example by a chain drive, when the second drive path is selected.

A third alternate selectable drive path may be provided between the secondary shaft and the beater, the third drive path comprising a third sprocket mounted to, or integral with, the hub, and a fourth sprocket keyed to the secondary shaft, wherein the third and fourth sprockets are configured for coupling together when the third drive path is selected.

In accordance with a second aspect of the invention there is provided a method of providing a multi-speed feed beater in a combine harvester, the method comprising the steps of:

providing an axial flow crop processor with a rotor mounted for rotation inside a rotor housing on a substantially longitudinal axis with respect to a combine harvester;

mounting a feed beater on a beater shaft using bearings to permit relative rotational movement, the feed beater serving to tangentially impel crop material into the crop processor;

providing a secondary shaft arranged parallel to the beater shaft;

mechanically coupling the beater to one of the beater shaft and secondary drive shaft; and, driving both the beater shaft and the secondary shaft simultaneously.

BRIEF DESCRIPTION OF THE DRAWINGS

Further advantages of the invention will become apparent from reading the following description of a specific embodiment with reference to the appended drawings in which:—

DETAILED DESCRIPTION OF SPECIFIC EMBODIMENTS

Relative terms such as 'front', 'rear', 'left', 'right', 'longitudinal' and 'transverse' will be made with reference to the longitudinal axis of a combine harvester travelling in the normal forward direction of travel indicated by arrow F in FIG. 1. The terms 'direction of conveyance', 'upstream', and 'downstream' are made with reference to the general flow of crop material through the combine harvester. The terms 'axial', 'radial' and 'tangential' will be used in relation to the associated rotation axis.

Figure 1:
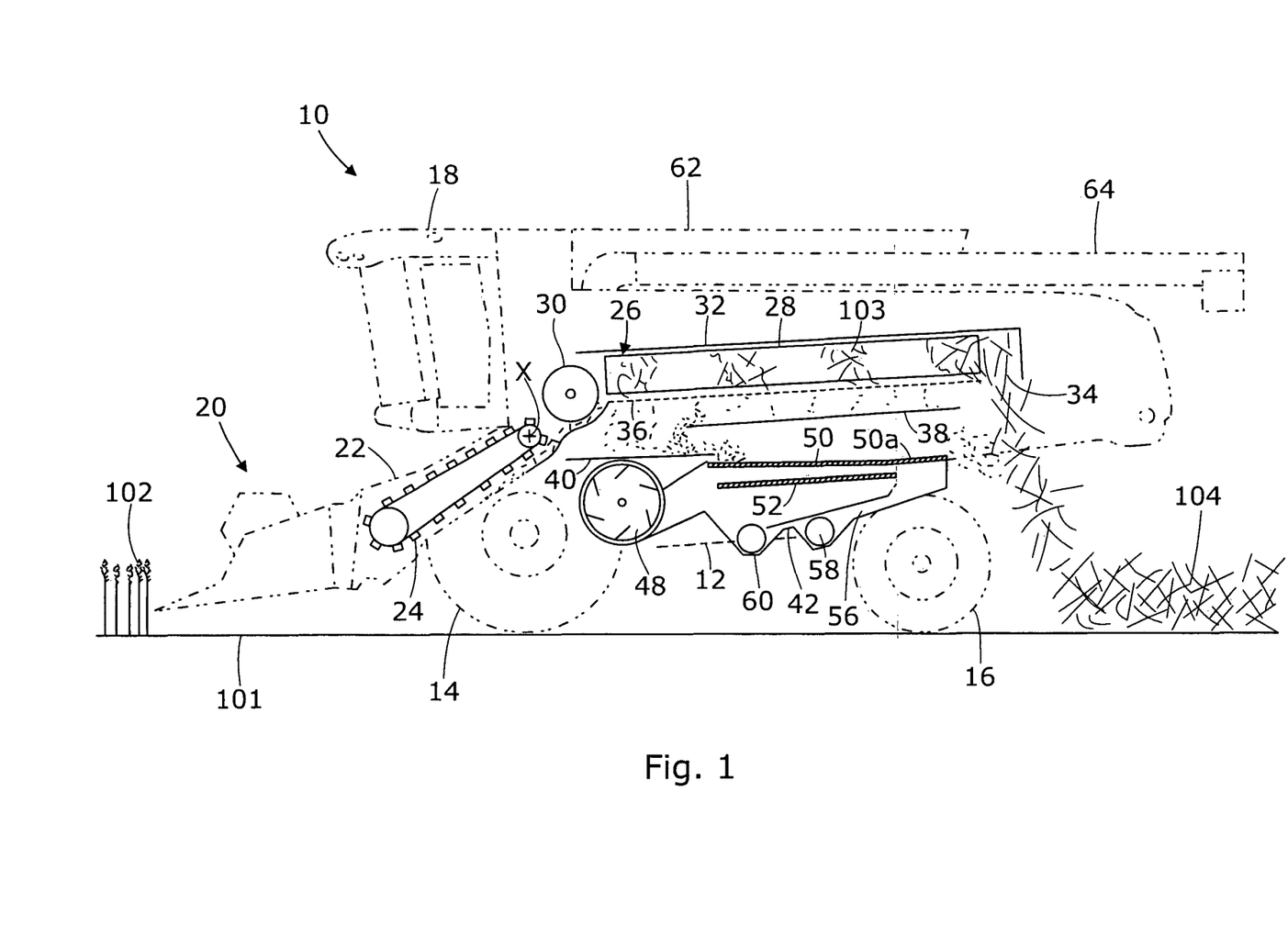
FIG. 1 is a schematic left-side view of combine harvester showing the internal workings thereof.

FIG. 1 illustrates in schematic form the main components of the crop processing systems of a combine harvester 10 and will be used to explain the flow of material below. The crop processing system is shown in solid lines whilst the outline profile of harvester 10 is shown in ghost form. Thereafter, specific embodiments of the invention will be described.

Combine harvester 10, hereinafter referred to as 'combine', includes a frame 12 supported on front wheels 14 and rear steerable wheels 16 which engage the ground 101. A driver's cab 18 is also supported on the frame 12 and houses a driver's station from where a driver controls the combine 10.

A cutting header 20 is detachably supported on the front of a feederhouse 22 which is pivotable about a transverse axis x to lift and lower the header 20 in a conventional manner.

The combine 10 is driven in a forward direction (arrow F) across a field of standing crop 102 in a known manner. The header 20 serves to cut and gather the standing crop material before conveying such as a crop material stream into feederhouse 22. An elevator 24, in the form of a chain and slat elevator, is housed within the feederhouse 22 and serves to convey the crop material stream upwardly and rearwardly from the header 20 to the crop processor designated generally at 26. At this stage the crop material stream is unprocessed.

The crop processor 26 of the illustrated combine 10 includes an axial flow threshing and separating rotor 28 fed by a tangential flow, crop material impelling, feed beater 30.

Figure 4:
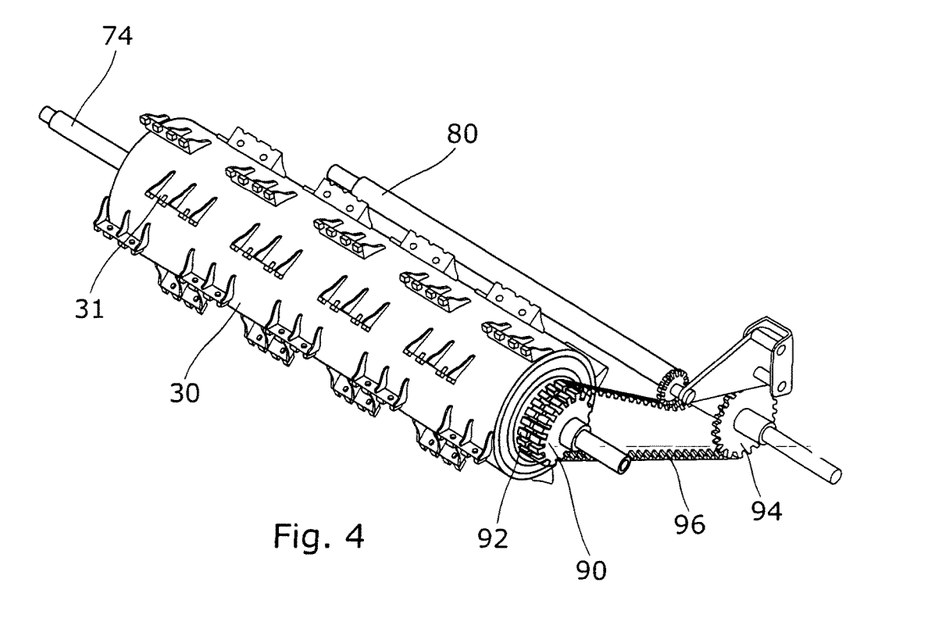
FIG. 4 is a front left perspective view of a feed beater and drive system in accordance with a first embodiment of the invention.

The feed beater 30 rotates on a transverse axis and comprises crop engaging elements 31 (FIG. 4) which convey the crop material stream under the beater and into rotor housing 32 which houses said rotor 28.

The rotor 28 is positioned to have a generally longitudinal, or fore and aft, rotation axis which is normally inclined upwardly towards the rear of the combine 10.

Flighting elements (not shown) provided on the front end of rotor 28 engage the crop material stream which is then conveyed as a ribbon or mat 103 in a generally rearward axial and helical path in the space between the rotor 28 and the rotor housing 32.

Axial flow rotor 28 serves to thresh the crop stream in a front region, separate the grain therefrom in a rear region, and eject the straw residue through an outlet 34 in the housing 32 at the rear of the machine either directly onto the ground in a windrow 104 as shown, or via a straw chopper (not shown).

A part-cylindrical grate 36 provided in the underside of each rotor housing 32 allows the separated material to fall by gravity onto either a return pan 38 located below a rear section of the processor 26, or directly onto a grain pan 40 located below a front section of the processor 26. In reality the separated material falling through the grate 36 is typically a mix of grain and material other than grain (MOG) which may include chaff, tailings and some straw.

Although the crop processor illustrated comprises a single axial-flow separating rotor, in an alternative embodiment a pair of side-by-side rotors are employed instead.

The return pan 38 and grain pan 40 convey the separated crop material to a grain cleaning shoe designated generally at 42. The grain-MOG mix falls from the rear edge of the grain pan 40 into the cleaning shoe 42 where the cascading mix is subjected to a cleaning airstream generated by fan 48, before falling onto the front of upper sieve or chaffer 50.

Chaffer 50 comprises adjustable louvres supported on a frame which is driven in fore-and-aft oscillating manner. The material which settles on the chaffer 50 is conveyed in a generally rearward direction and the heavier smaller grain-rich material passes between the louvres onto an underlying lower sieve 52, whereas the lighter larger material passes to the end of the chaffer and out of the rear of the machine at 54. A rear section of chaffer 50a is commonly independently adjustable and is configurable to allow un-threshed tailings to pass therethrough into a re-threshing region 56 from where the tailings are conveyed via a re-threshing auger 58 back to the processor 26.

Lower sieve 52 is also driven in an oscillating manner to convey the collected grain-MOG mix rearwardly wherein the material falling therethrough is collected by a clean grain auger 60 for conveyance to an elevator (not shown) for onward conveyance to a grain tank 62. Material which does not pass through lower sieve 52 and is instead conveyed off the rear edge thereof falls into re-threshing region 56 for subsequent re-threshing.

The airstream generated by fan unit 48 is also conveyed by ducting up through lower sieve 52 and chaffer 50 to encourage lifting of the MOG from the chaffer surface.

For completeness the combine 10 includes an unloading system which includes an unloading auger 64.

The invention relates to a multi-speed drive system for the feed beater 30. A first embodiment will now be described with reference to FIGS. 2 to 6.

An internal combustion engine (not shown) provides power to drive the propulsion and crop processing systems of the combine 10. A clutch (not shown) allows an operator to selectively engage and disengage the crop processing systems, often collectively termed as the 'threshing gear'.

The crop processing systems include the header 20, elevator 24, feed beater 30, threshing rotor 28, conveyance pans 38, 40, the cleaning shoe 42, and the clean grain elevator (not shown). These systems may be grouped so as to be driven, engaged and disengaged simultaneously.

Figure 2:
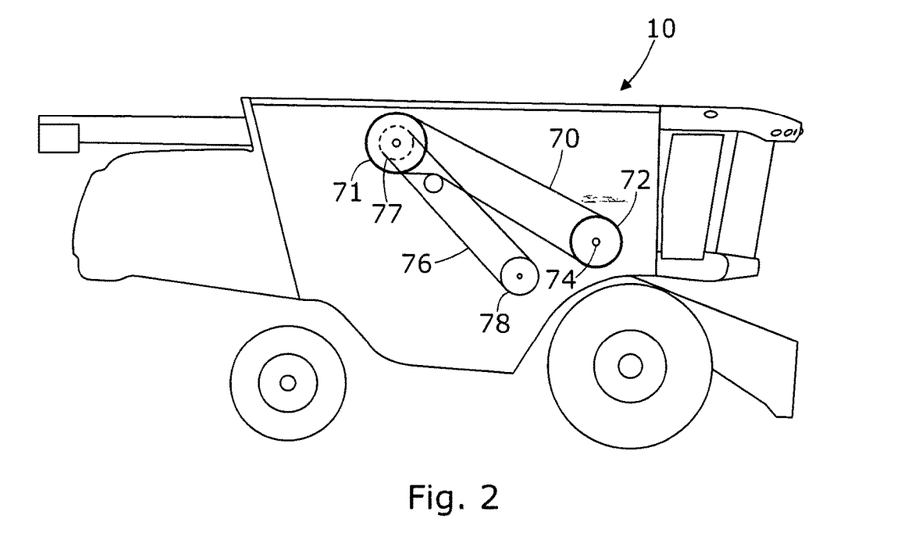
FIG. 2 is a schematic representation of a part of a feed beater drive system of the combine harvester of FIG. 1, viewed from the right-hand side.

The feed beater drive system illustrated includes a first belt drive 70 trained around a driving pulley 71 and a driven pulley 72. The driving pulley 71 is drivingly connected to the internal combustion engine whereas the driven pulley 72 is keyed onto a beater shaft 74.

Figure 3:
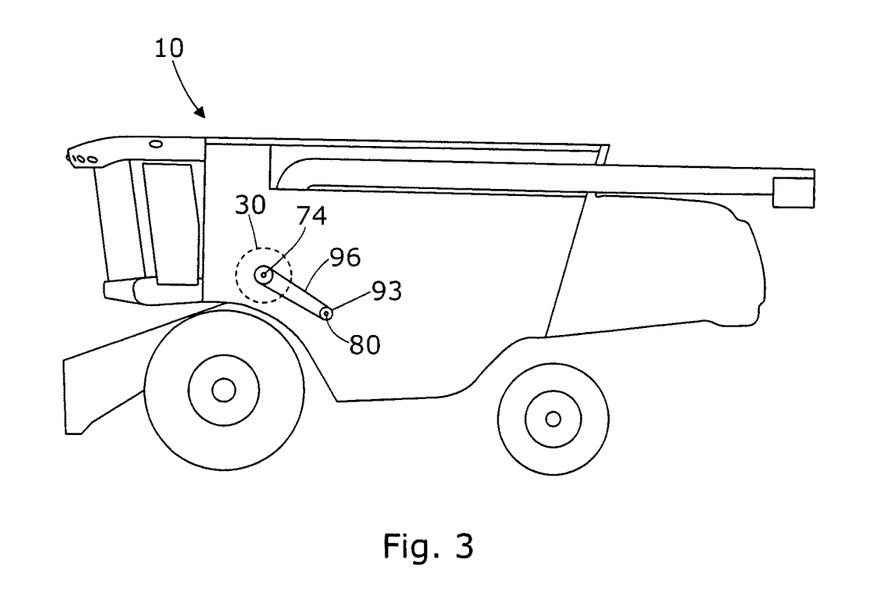
FIG. 3 is a schematic representation of another part of the feed beater drive system of the combine harvester of FIG. 1, viewed from the left-hand side.

The cleaning shoe 42 is also driven by power derived from the internal combustion engine. In particular, the sieves 50, 52 are driven in oscillation via a linkage which derives torque via a second belt drive 76 trained around a driving pulley 77 and a driven pulley 78. The driving pulley 77 rotates coaxially with driving pulley 71 and is also drivingly connected to the internal combustion engine whereas the driven pulley 78 is keyed onto a shoe shaft 80.

Beater shaft 74 is mounted to the frame 12 to permit rotation on a rotation axis y. Shoe shaft 80 is mounted to the frame 12 to permit rotation on a rotation axis z.

The belt drives 70, 76 and associated pulleys 71, 72, 77, 78 are located on the right-hand side of the combine 10. However, it is envisaged that they may be located instead on the left-hand side.

It should be understood that the belt drives which deliver power from the engine to the feed beater 30 and cleaning shoe 42 are illustrated and described by way of example and in a schematic form. The respective drive systems may comprise a plurality of separate intermediate drive stages. However, the important aspect to note is that both the beater shaft 74 and the shoe shaft 80 both derive power from a common source and are driven simultaneously while the threshing gear is engaged.

The drive linkage between the shoe shaft 80 and the sieves 50, 52 is omitted from the drawings for clarity.

Figure 6:
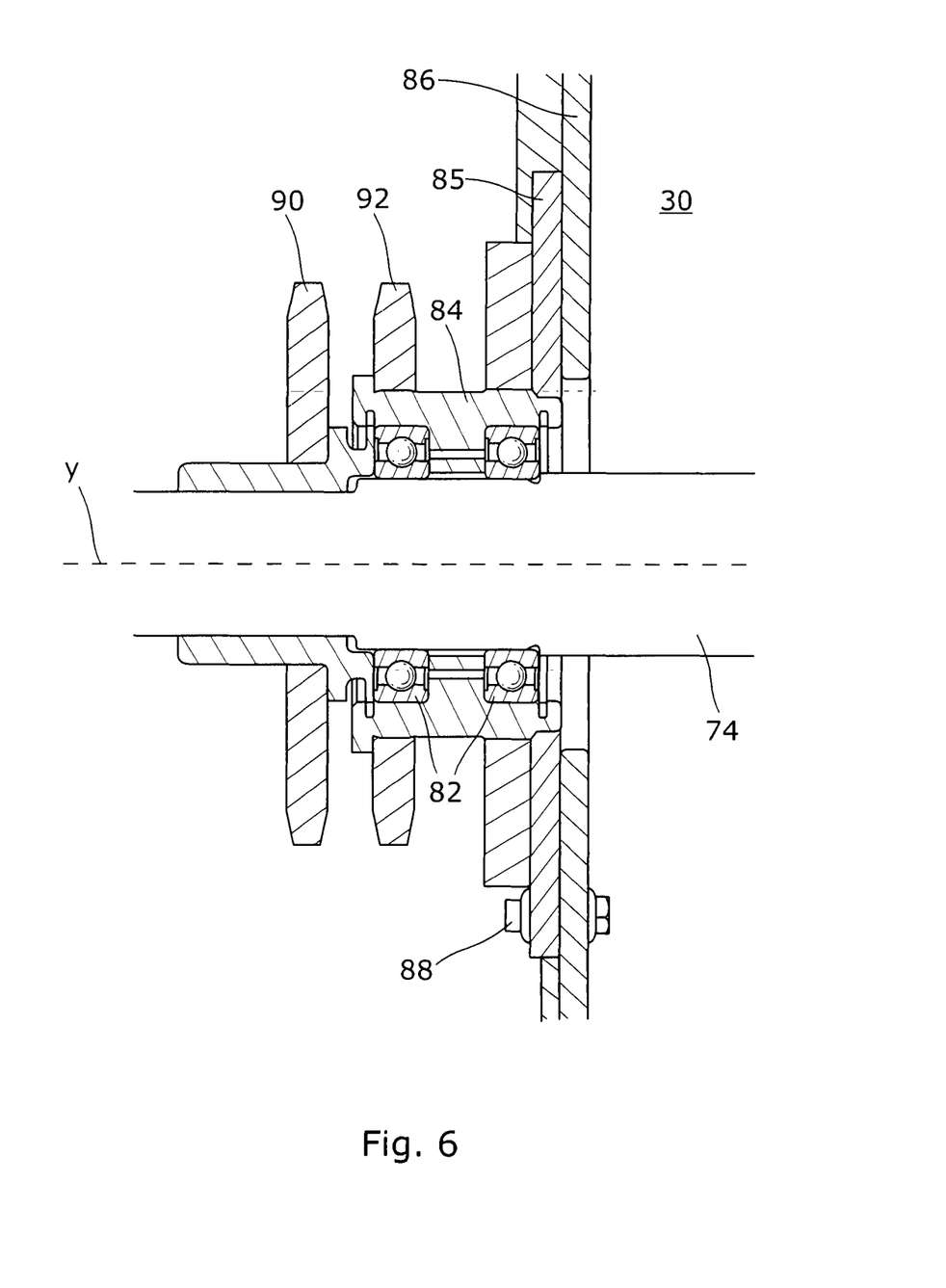
FIG. 6 is an enlarged horizontal section of an end portion of the beater shaft of FIG. 4 showing the first and second sprockets mounted thereon; and, FIGS. 7 and 8 are horizontal sections, viewed from above, taken through the rotation axes of the beater shaft and secondary shaft respectively of a beater drive system in accordance with a second embodiment of the invention.

With particular reference to FIG. 6, the feed beater 30 is mounted upon beater shaft 74 through bearings 82 which permit relative rotation therebetween. A hub 84 is mounted upon the bearings 82 and has a flange plate 85 which is secured against the left-hand end wall 86 of beater 30 by bolts 88. The hub 84 therefore rotates with the beater 30.

A first sprocket 90 is keyed to the outboard end of beater shaft 74. A second, similar sized, sprocket 92 is keyed to, or is integral with, hub 84. To select a first beater drive speed, a chain coupler connects together the first and second sprockets 90, 92. In this mode of operation, the beater speed equates to the speed of the beater shaft 74 and driven pulley 72.

Figure 5:
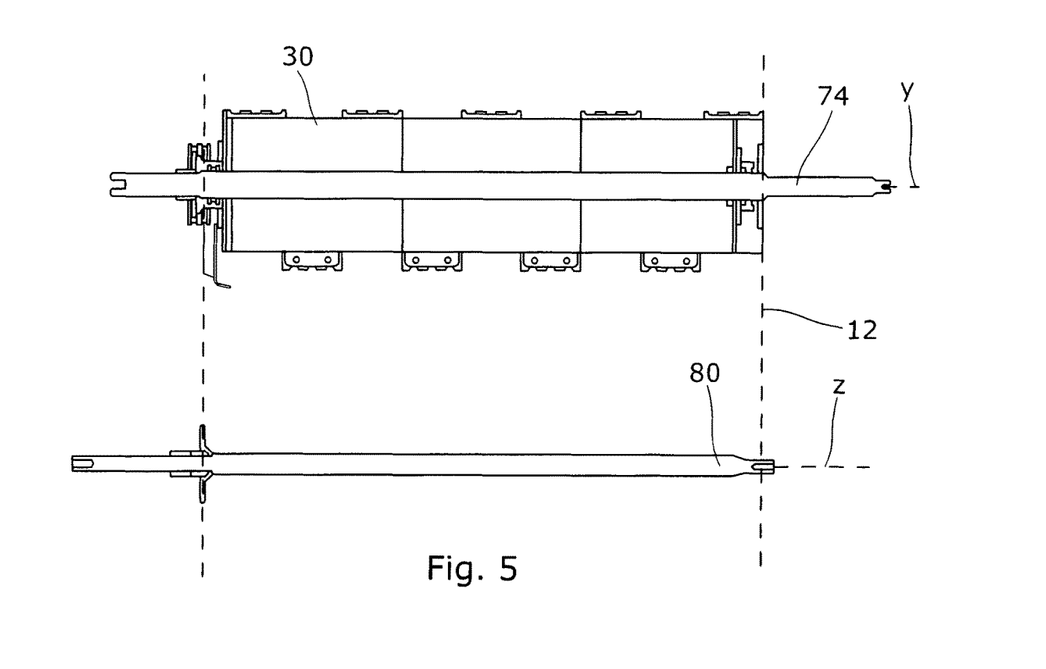
FIG. 5 is a horizontal section, viewed from above, taken through the rotation axes of the beater shaft and secondary shaft of the system of FIG. 4.

To achieve a second drive speed for the beater, the beater 30 is decoupled from the beater shaft 74 (by removal of the chain coupler) and coupled to the shoe shaft 80. A third sprocket 94 keyed onto the left-hand end of shoe shaft 80 is drivingly connected to second sprocket 92 by the addition of a chain drive 96. The shoe shaft 80, already driven for the purposes of operation of the cleaning shoe 42, drives the beater 30 in a second mode of operation. The rotation speed of shoe shaft 80 and the sizes of second and third sprockets 92, 94 determine the drive speed of the feed beater 30 in the second mode.

Figure 7:
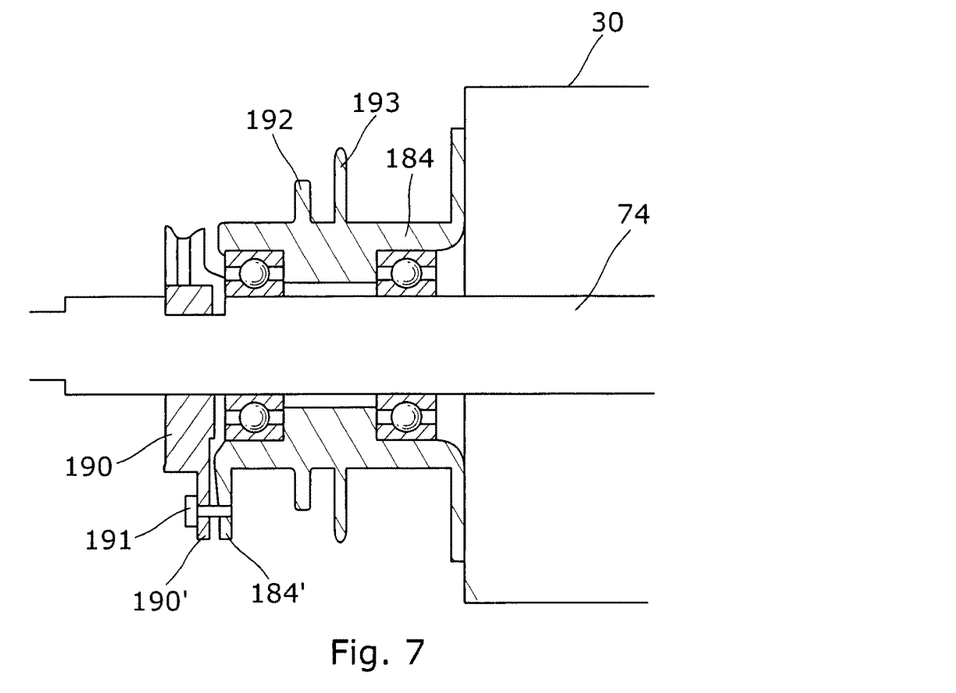
Figure 8:
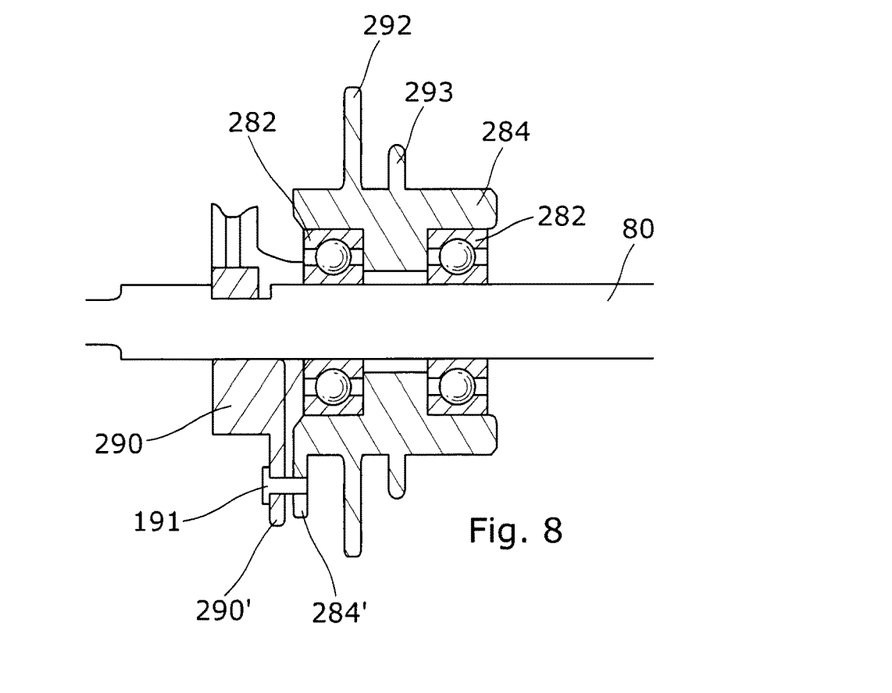

In a second, alternative, embodiment illustrated in FIGS. 7 and 8, a hub 184 is mounted through bearings to the beater shaft 74 and is secured to an end wall of the beater 30 in a similar fashion to the previous embodiment. Instead of the sprocket 90, a collar 190 is keyed to the outboard end of beater shaft 74. Each of the collar 190 and hub 184 comprises a respective flange 190', 184' each including a hole, wherein the holes can be aligned for the receipt of a connecting bolt 191 which effectively couples the beater shaft 74 to the beater 30 in a first, direct, drive mode.

Second and third alternative beater drive speeds are achieved by removal of bolt 191 from the collar 190 and subsequently inserting the bolt 191 into a similar mechanism provided on the left-hand outboard end of shoe shaft 80 as illustrated in FIG. 8. A hub 284 is mounted onto shoe shaft 80 through bearings 282 to permit relative rotation therebetween. A collar 290 is keyed onto the outboard end of shoe shaft 80. Each of the collar 290 and hub 284 comprises a respective flange 290', 284' each including a hole, wherein the holes can be aligned for the receipt of the connecting bolt 191 which effectively couples the hub 284 to the shoe shaft in the second and third alternative drive modes.

Beater hub 184 comprises first and second sprockets 192, 193 having different sizes. Shoes shaft hub 284 comprises third and fourth sprockets 292, 293 having different sizes. A chain (not shown) selectively connects respective pairs of sprockets on the two hubs 184, 284. In a second drive mode, the chain is trained around first and third sprockets 192, 292 to achieve a second drive speed. In a third drive mode, the chain is instead trained around the second and fourth sprockets 193, 293 to achieve a third drive speed.

Note that in the first drive mode, in which the beater 30 is coupled direct to the beater shaft 74, the hub 284 is decoupled from the shoe shaft 80 by the absence of bolt 191 from flanges 290', 284'. In the second and third drive modes, the hub 184 is decoupled from the beater shaft 74 whilst the hub 284 is coupled to the shoe shaft 80.

Advantageously, a multi-speed beater drive system is provided by exploiting the rotation of one of a plurality of alternative rotating shafts. Switching between drive speeds is simply done by adding, removing or moving chain couplers.

Although the above-described embodiments exploit the rotation of the shoe shaft (connected to the sieves), it is envisaged that alternative shafts associated with the driveline of other processing systems may instead be exploited in a similar manner without deviating from the invention. For example, the shaft associated with the upper sprocket of the front elevator may be utilised to provide an alternative drive speed for the beater.

In summary there is provided a combine harvester comprises an axial flow crop processor fed by a tangentially impelling feed beater mounted for rotation on a substantially transverse axis. A multi-speed beater drive system comprises a beater shaft upon which the beater is mounted via bearings to permit relative rotational movement, and a secondary shaft arranged parallel to the beater shaft. To achieve a first beater drive speed a first drive path is closed between the beater shaft and the beater. To achieve an alternative, second beater drive speed a second, alternate, drive path is closed between the secondary shaft and the beater. Both the beater shaft and the secondary shaft are driven simultaneously during operation.

It should be emphasized that the above-described embodiments of the present disclosure are merely possible examples of implementation, merely set forth for a clear understanding of the principles of the disclosure. Many variations and modifications may be made to the above-described embodiments of the disclosure without departing substantially from the spirit and principles of the disclosure.

The invention claimed is:

1. A combine harvester comprising:
   an axial flow crop processor with a rotor mounted for rotation inside a rotor housing arranged substantially longitudinally with respect to the harvester;
   a feed beater mounted for rotation on a substantially transverse axis and serving to tangentially impel crop material into the crop processor;
   a multi-speed beater drive system comprising:
      a beater shaft upon which the beater is mounted via bearings to permit relative rotational movement;
      a secondary shaft arranged parallel to the beater shaft;
      a first selectable drive path between the beater shaft and the beater; and,
      a second, alternate, selectable drive path between the secondary shaft and the beater; and
   a grain cleaning shoe driven via a driveline which includes the secondary shaft;
      wherein both the beater shaft and the secondary shaft are driven simultaneously during operation.

2. The combine harvester according to claim 1, wherein the first drive path comprises a selectable drive connection between the beater shaft and the beater.

3. The combine harvester according to claim 2, wherein the first drive path comprises a first sprocket keyed to the beater shaft, and a second sprocket mounted for rotation on the beater shaft in a fixed relationship with the feed beater, wherein the first and second sprockets are configured for coupling together when the first drive path is selected.

4. The combine harvester according to claim 3, wherein the first drive path comprises a chain coupler for coupling the first and second sprockets together.

5. The combine harvester according to claim 3, wherein the second drive path comprises the second sprocket, and a third sprocket keyed to the secondary shaft, wherein the second and third sprockets are configured for coupling together when the second drive path is selected.

6. The combine harvester according to claim 2, wherein the first selectable drive path comprises a collar keyed to the beater shaft, and a hub mounted for rotation on the beater shaft in a fixed relationship with the feed beater, wherein each of the collar and hub comprise an integral flange, each flange having an axial hole which are mutually alignable for receiving a bolt for coupling the collar and hub together.

7. The combine harvester according to claim 6, wherein the second drive path comprises a first sprocket mounted to, or integral with, the hub, and a second sprocket keyed to the secondary shaft, wherein the first and second sprockets are configured for coupling together when the second drive path is selected.

8. The combine harvester according to claim 7, wherein the beater drive system comprises a third alternate selectable drive path between the secondary shaft and the beater, the third drive path comprising a third sprocket mounted to, or integral with, the hub, and a fourth sprocket keyed to the secondary shaft, wherein the third and fourth sprockets are configured for coupling together when the third drive path is selected.

9. The combine harvester according to claim 7, wherein the second drive path comprises a chain drive for coupling the third and fourth sprockets together.

10. The combine harvester according to claim 7, wherein the second drive path comprises a chain drive for coupling the first and second sprockets together.

11. A method of providing a multi-speed feed beater in a combine harvester, the method comprising the steps of:
   providing an axial flow crop processor with a rotor mounted for rotation inside a rotor housing on a substantially longitudinal axis with respect to the combine harvester;
   mounting a feed beater on a beater shaft using bearings to permit relative rotational movement, the feed beater serving to tangentially impel crop material into the crop processor;
   providing a secondary shaft arranged parallel to the beater shaft;
   driving a grain cleaning shoe via the secondary shaft;
   mechanically coupling the beater to one of the beater shaft and secondary drive shaft; and,
   driving both the beater shaft and the secondary shaft simultaneously.

12. The method according to claim 11, further comprising the steps of:
   providing a first mechanical coupling to couple the beater to the beater shaft; and,
   providing a second alternative mechanical coupling to couple the beater to the secondary shaft.

* * * * *